May 8, 1951  A. J. BRANDECKER  2,552,396
FORCED AIR COOLING APPARATUS
Filed May 18, 1949
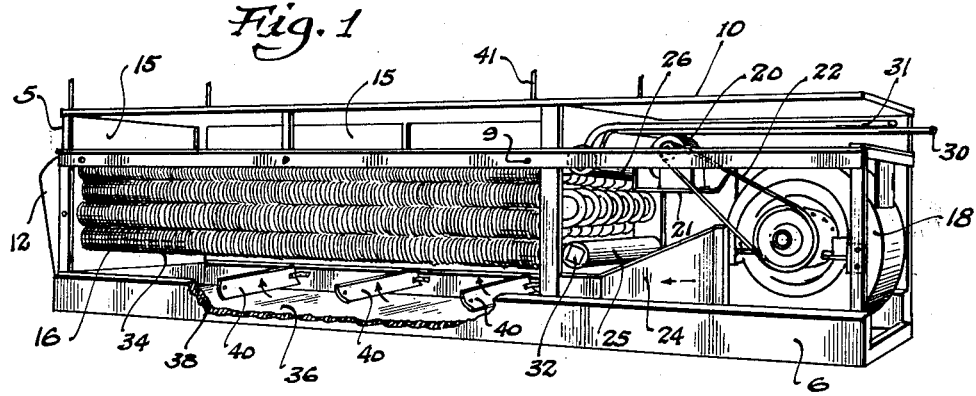
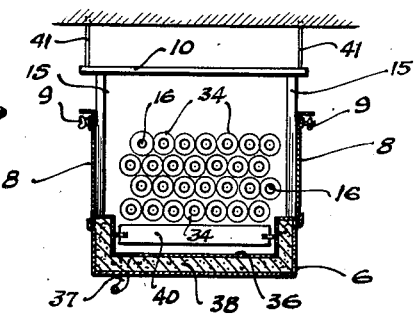
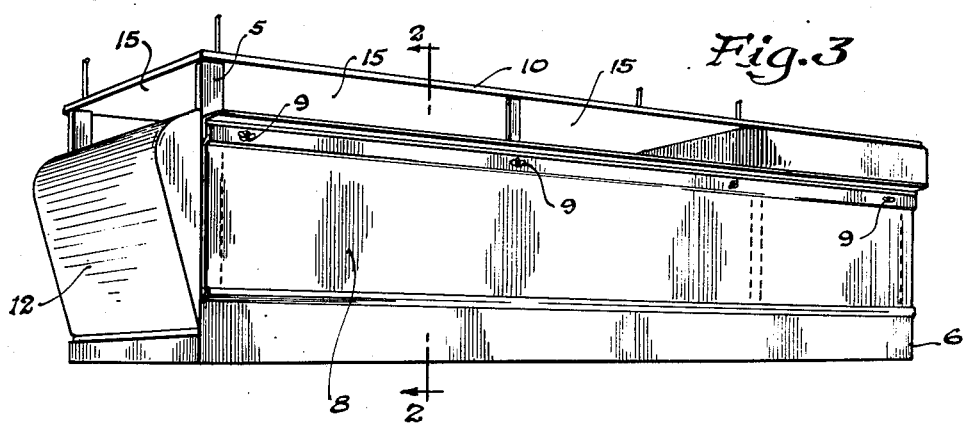
Inventor
August J. Brandecker Patented May 8, 1951

2,552,396

UNITED STATES PATENT OFFICE 2,552,396

FORCED AIR COOLING APPARATUS

August J. Brandecker, Chicago, Ill.

Application May 18, 1949, Serial No. 93,859

3 Claims. (Cl. 62—129)

This invention relates to refrigeration apparatus and has to do more particularly with a cooling unit for chilling the air in the space surrounding perishable food products and the like.

In the manufacture of fresh foods, such as meats, dairy and poultry products, and fruits and vegetables, it is necessary to chill the products and maintain them during storage at low temperatures in order to retard growth of bacteria therein and spoilage. The chilling of the products is usually performed by refrigerating the air which surrounds and contacts the materials.

A common method heretofore used in refrigerating the air in coolers and cold storage rooms is to circulate a refrigerating medium, such as cold salt brine or ammonia, through bare metal coils which transfer the cold to the surrounding air. This method has many disadvantages. For example, close control of temperature is difficult because there is slow circulation of the air and dead spots develop. Also, there is undesirable dehydration and shrinkage of the product due to a drop in humidity of the air as it is cooled. Thus, the air contacting the coils is overchilled and the water precipitated therefrom, and then moisture is extracted from the product by the dry air. Furthermore, the moisture collects on the cooling coils, causing drippage and eventually causing the accumulation of ice on the pipes which reduces their cooling efficiency.

An object of the present invention is to provide a simple and efficient space cooling unit which will eliminate the difficulties inherent in the prior art space coolers.

Another object of the invention is to provide a space cooler which will reduce shrinkage of the product.

A further object of the invention is to provide a space cooler which will give close temperature control and reduce chilling time.

Another object of the invention is to provide a space cooling unit which produces improved conditions of air circulation and air humidity.

Also, an object of the invention is to devise a space cooler which reduces drippage and which eliminates messy drip pans.

A still further object of the invention is to construct a space cooler which is easily cleaned and provides ready access to working parts.

The invention will be more clearly understood from the following description read in connection with the accompanying drawing which illustrates diagrammatically one form of construction of the apparatus.

Figure 1 is a side view of the apparatus with a panel removed showing the working parts.

Figure 2 is a sectional elevation along the line 2—2 of Figure 3.

Figure 3 is a view in perspective of the left end and right side of the complete unit.

Referring to the drawings, the cooling unit is housed in a rectangular body comprising a frame designated generally by the numeral 5. The lower portion of the frame is covered with a bottom 6. Panels 8 are attached to the frame on each side by thumb screws 9. The top of the frame is covered by a plate 10. The left end of the frame is closed by a curved end member 12 which is bulged outwardly to permit room for the return bends of the cooling coils. A plurality of ports 15 is provided in the upper portions of the sides and the left end. Except for the ports 15 and the open right end, the frame is completely enclosed, as shown in Figures 2 and 3.

The working parts enclosed within the housing comprise a series of cooling coils 16, a blower 18, and a motor 20 which is suspended from the upper portion of the frame by a supporting means 21. The blower is connected to the motor by a belt 22. A duct 24 provides air communication between the blower and the space surrounding the coils 16. The duct 24 is adapted to discharge the air beneath the coils 16. The coils are supplied with a suitable refrigerant by an inlet pipe 30 and an outlet pipe 31 which connect with headers 25 and 26, respectively. The headers are provided with plugs 32 for cleaning out sediment collecting in the coils. In order to increase the efficiency of the coils 16, they are equipped with fins 34. The fins are preferably in the form of a continuous metal ribbon spirally wound on the tubes thereby forming a positive metal contact between the fin and the tube surface. Corrugations at the base of the fins afford large metal-to-metal contact and provide permanent bonding to the tube. This type of structure is highly efficient and increases the effective heat transfer surface.

As shown in Figures 1 and 2, a pan 36 is located in the lower portion of the unit beneath the coils 16. A drain pipe 37 is connected with the bottom of the pan to drain condensate therefrom. Insulation 38 is packed between the pan 36 and the bottom 6 to prevent chilling of the bottom 6 by the condensate and to avoid condensation and drippage of moisture from the bottom. A plurality of baffles or ribs 40, preferably curved in shape, is positioned in spaced relation over the pan 36 to deflect the air passing thereover upwardly around the coils 16.

The cooling unit herein described may be located any suitable place in the space to be cooled, as, for example, any desired height on a wall or to the ceiling of the room. The unit is preferably suspended from the ceiling by means of the bolts or hooks 41.

In operation the cooling unit may be suspended a suitable distance below the ceiling at one end of the room to be cooled. The inlet and outlet pipes 30 and 31 are connected to an ammonia compression system. The liquid ammonia is discharged through the pipe 30 into the coils 16 wherein it expands and absorbs heat from the air surrounding the coils thereby causing cooling. The vaporized and warmed ammonia gas is drawn from the coils through the suction line 31 and cooled and compresed into liquid form for reuse. Air is drawn from the room through the right end of the unit by the blower and discharged through the duct 24. The air is deflected by the baffles 40 upwardly over the coils where it is cooled. The chilled air is then discharged through the ports 15 into the room.

The cooler of the present invention has the advantage that it occupies little space and can be located at a convenient out-of-the-way place in the room. The insulation in the bottom eliminates condensation on and drippage from the outside of the bottom. The detachable panels 8 are easily removed so that the unit may be readily cleaned. The circulation of the air through the unit enables close temperature control and avoids dead air spaces in the room. Also, the circulating air causes uniform cooling and avoids local over chilling. The humidity of the air is relatively high at all times and dehydration and shrinkage of the product are substantially reduced.

Obviously, many modifications and variations of the invention as hereinbefore set forth may be made without departing from the spirit and scope thereof, and therefore only such limitations should be imposed as are indicated in the appended claims.

I claim:

1. In a cooling unit of the type adapted to be suspended from the ceiling of a refrigeration chamber and composed of a rectangular housing containing a refrigerating unit disposed toward one end of said housing and a blower disposed toward the other end and means for conducting air from the blower end under said refrigerating unit and upwardly thereover, the combination of longitudinally spaced deflectors under said refrigerating unit to distribute and to deflect the air uniformly over said refrigerating unit, a drip pan under said deflectors, said drip pan spaced above the floor of the housing, and insulation between the drip pan and said floor to prevent cooling of the floor by drip water.

2. In a cooling unit of the type adapted to be suspended from the ceiling of a refrigeration chamber and composed of a frame containing an elongated refrigerating unit occupying the major portion of one end of the frame and a blower toward the other end and means for conducting air from the blower end under said refrigerating unit, the combination of removable side walls on said frame, a top on said frame which is spaced above said side walls to provide ports for discharging cool air into said chamber, a bottom secured to the lower portion of said frame, baffles longitudinally spaced under said refrigerating unit to deflect upward and to distribute uniformly over the refrigerating unit air from said blower, a drip pan under said refrigerating unit and under said baffles, said drip pan being spaced above the bottom, and insulation between the drip pan and said bottom to prevent cooling of the bottom by drip water and the formation of condensate on the exterior of said bottom.

3. In a cooling unit of the type adapted to be suspended from the ceiling of a chamber to be cooled, the combination of a rectangular housing having an opening at one end, a blower near said opening to draw air to be cooled through said opening, elongated cooling coils occupying the major portion of the housing and located toward the end opposite said blower, a duct to conduct air from the blower under said coils, a plurality of spaced baffles under said coils, said baffles having a curved structure to deflect the air uniformly and upwardly over said coils, ports under the top of said housing and above said coils to discharge cooled air into said chamber, a drip pan under said coils and under said baffles, said drip pan being spaced above the bottom of said housing, and insulation between the drip pan and said bottom to prevent cooling of the bottom by drip water and the formation of condensate on the exterior of said bottom.

AUGUST J. BRANDECKER.

REFERENCES CITED

The following references are of record in the file of this patent:

UNITED STATES PATENTS

| Number | Name | Date |
|---|---|---|
| 1,827,410 | Warren | Oct. 13, 1931 |
| 2,111,133 | Zwickel | Mar. 15, 1938 |
| 2,181,635 | Tull | Nov. 28, 1939 |
| 2,243,958 | Hermann | June 3, 1941 |
| 2,318,393 | Honerkamp et al. | May 4, 1943 |
| 2,369,511 | Winkler | Feb. 13, 1945 |
| 2,451,903 | Bauman | Oct. 19, 1948 |
| 2,454,654 | Kaufman | Nov. 23, 1948 |
| 2,460,150 | Schupp | Jan. 25, 1949 |
| 2,526,243 | Lange | Oct. 17, 1950 |